June 10, 1930. J. D. TUCKER 1,762,805
MIXING BOWL HOLDER
Filed May 21, 1928

INVENTOR
JAMES D. TUCKER
BY *Hazard and Miller*
ATTORNEYS

Patented June 10, 1930

1,762,805

UNITED STATES PATENT OFFICE

JAMES D. TUCKER, OF SIERRA MADRE, CALIFORNIA

MIXING-BOWL HOLDER

Application filed May 21, 1928. Serial No. 279,239.

This invention relates to holding devices, and more particularly to devices for securely holding a receptacle motionless to facilitate the use of the receptacle for such operations as mixing substances within the receptacle.

An object of the invention is the provision of a device adapted to removably and securely retain a receptacle in position while that receptacle is being employed in any manner such as mixing foods therein.

Another object is the provision of a receptacle holder as described which is adjustable so as to accommodate receptacles of various size.

Another object is the provision of a receptacle holder which has incorporated therewith means for removably and securely attaching the holder to a supporting structure.

The invention possesses other objects and features of advantage, some of which, with the foregoing, will be set forth in the following description of the preferred form of the invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

In its broad conception, the holder of the present invention comprises a base having apertures therein for the reception of pegs between which a receptacle may be positioned and retained. Thus it may be seen that this device has an especial field of utility as a kitchen utensil, since by its use, it is made possible to retain such receptacles as a mixing bowl securely in position while such operations as mixing batter within the bowl are being carried out, leaving both hands of the operator free to carry out the mixing operation.

Figure 3:
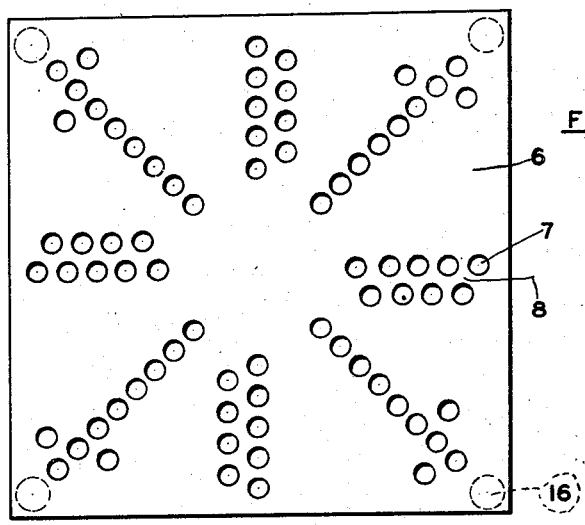
Fig. 3 is a top plan view of the base after the receptacle and holding pegs have been removed.
Figure 4:
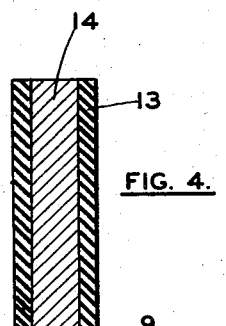
Fig. 4 is an enlarged vertical sectional view of a portion of the base and one of the holding pegs.
Figure 1:
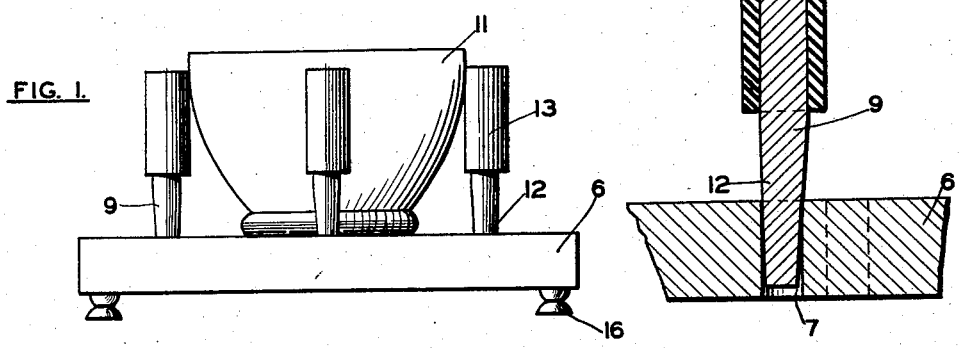
Figure 1 is a side elevation of the holder of my invention, with a mixing bowl retained in position thereupon.
Figure 2:
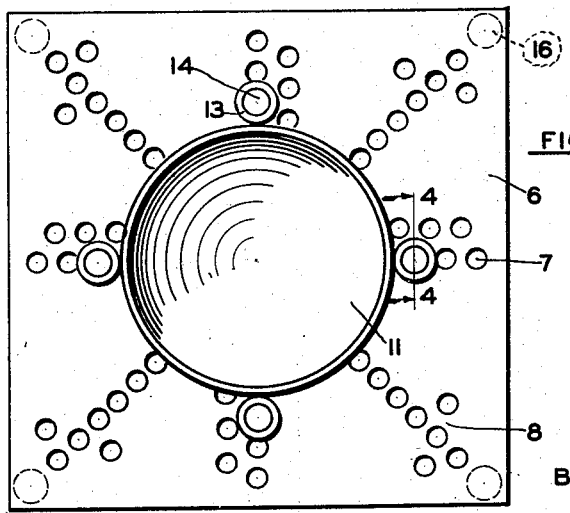
Fig. 2 is a top plan view of the device and receptacle of Fig. 1.

Specifically describing the present embodiment of my invention, a base 6 is provided with a plurality of holes 7 in the top face thereof. For the sake of convenience in manufacture, the holes 7 may extend through the base 6 as shown in Fig. 4. Preferably, the holes 7 are arranged in a plurality of groups 8, radiating from a common center within the base 6.

The holes 7 are all of a common size so that holding pegs 9 may be positioned upon the base 6 by inserting them into certain of the holes in any selected arrangement. Thus the pegs 9 may be positioned to determine an intervening space therebetween corresponding to the size of the receptable 11 to be held.

Preferably, the holes 7 of each group 8 are staggered and closely spaced to reduce the difference in the radial distances of the holes from the common center so that it is possible to so position the pegs in the various groups 8, that receptacles 11 of any size and shape within limits may be frictionally retained between the pegs 9.

The lower ends 12 of the pegs are tapered to facilitate their insertion into the holes 7; and any suitable friction means such as a length of rubber tube 13, is positioned upon the upper end 14 of each of the pegs 9, to enhance the frictional engagement of the pegs 9 with the receptacle 11.

Means are also provided for rigidly and removably attaching the base 6 to any suitable supporting structure such as a table or workbench. The preferred form of this attaching means comprises a plurality of vacuum cups 16 upon the under face of the base 6. By moistening these vacuum cups 16 and then pressing the base 6 downwards upon the supporting structure so that the vacuum cups 16 are flattened to eject the air from between them and their supporting structure, the base 6 will be securely attached to the supporting structure to permit any desired operation to be performed in the receptacle 11.

Thus it may be seen that a receptacle holder is provided which is especially convenient as a kitchen utensil, in that it may be utilized to hold a mixing bowl stationary while mixing batter, mayonnaise or other substances therein, leaving both hands of the operator free to carry out the various details of the mixing operation.

However, I do not wish to be limited to this precise use, in that the holding device may be employed wherever it is desired to hold the receptacle stationary.

I claim:

1. A holder for receptacles, comprising a base having a plurality of radiating groups of holes of equal size therein, holes of each group being staggered and closely spaced to reduce the difference in the radial distances of adjacent holes from a common center, pegs receivable within selected holes to determine an intervening space corresponding to the size of the receptacle to be held, a length of rubber tube disposed upon each of said pegs to frictionally engage the sides of said receptacle, and vacuum cups on the bottom of said base to removably secure the holder to a supporting structure.

2. A holder for receptacles, comprising a base having a plurality of radiating groups of holes of equal size therein, holes of each group being closely spaced to reduce the difference in the radial distances of adjacent holes from a common center, pegs receivable within selected holes to determine an intervening space corresponding to the size of the receptacle to be held, a length of rubber tube disposed upon each of said pegs to frictionally engage the sides of said receptacle, and means for removably securing the base to a supporting structure.

3. A holder for receptacles, comprising a base having a plurality of radiating groups of holes of equal size therein, holes of each group being closely spaced to reduce the difference in the radial distances of adjacent holes from a common center, pegs receivable within selected holes to determine an intervening space corresponding to the size of the receptacle to be held, and means carried by said pegs for frictionally engaging the sides of said receptacle.

4. A holder for receptacles, comprising a base having a plurality of holes therein, said holes being closely spaced to reduce the difference in radial distances thereof from a common center in the base, pegs receivable within selected holes to determine an intervening space corresponding to the size of the receptacle to be held, means on said pegs for frictionally engaging said receptacle, and vacuum cups on the bottom of said base for removably attaching the holder to a supporting structure.

In testimony whereof I have signed my name to this specification.

JAMES D. TUCKER.